United States Patent
Otte

[15] 3,693,873
[45] Sept. 26, 1972

[54] FLIGHT PATH CALCULATOR

[72] Inventor: Walter G. H. Otte, 1721 Windsor, Wichita, Kans. 67218

[22] Filed: July 8, 1971

[21] Appl. No.: 160,830

[52] U.S. Cl. ............................... 235/88, 235/61 NV
[51] Int. Cl. ............................................. G06c 3/00
[58] Field of Search ..235/78, 88, 61 NV, 61 S, 61 V; 33/1 SD

[56] References Cited

UNITED STATES PATENTS

| | | | |
|---|---|---|---|
| 2,508,894 | 5/1950 | Schloer | 235/88 |
| 2,861,745 | 11/1958 | O'Toole et al. | 235/61 S |
| 2,901,167 | 8/1959 | Mudge | 235/61 NV |
| 2,996,242 | 8/1961 | Bannister | 235/88 X |
| 3,084,858 | 4/1963 | Clapp | 235/84 |
| 3,220,644 | 11/1965 | Gaudio | 235/78 |
| 3,262,640 | 7/1966 | Jameson | 235/78 |
| 3,110,965 | 11/1963 | Kittock | 33/1 SD |

Primary Examiner—Richard B. Wilkinson
Assistant Examiner—Stanley A. Wal
Attorney—Robert E. Breidenthal

[57] ABSTRACT

A flight path calculator in the nature of a circular slide rule having first and second relatively movable scale bearing members. The first of such members is logarithmically scaled with numerical indicia interpretable either as having the dimension of vertical distance (feet) or the dimension of vertical speed (feet per minute) for respectively reading the same relative to a first logarithmic scale on the second member that carries numerical indicia of slope distance (nautical miles) and to a second logarithmic scale on the second member that carries numerical indicia of slope speed (knots). Means is provided for indicating the relative positions of the scale bearing members in terms of the slope angle appropriate to the relative settings of the vertical distance — slope distance scales or the vertical speed — slope speed scales. Index markers and a cursor are provided to facilitate reading the indicia of the various scales.

12 Claims, 3 Drawing Figures

PATENTED SEP 26 1972  3,693,873

INVENTOR.
WALTER G.H. OTTE

BY Robert E. Breidenthal

ATTORNEY

FLIGHT PATH CALCULATOR

The present invention relates to new and useful improvements in computers or calculators of the slide rule type and pertains more particularly to a slide rule for calculating various values of maximum relevance to various flight instruments or indicators with respect to a defined flight path, such as the angle of slope of the path, the relationship of vertical distance to distance along the path, and the relationship of vertical speed to speed along the path.

A pilot is frequently confronted with problems concerning a flight path of ascent or descent, especially in the proximity of airports, and must in the interest of safety be able to solve such problems quickly and with adequate accuracy. This is obviously particularly true during flight on instruments when visability is destroyed or impaired by weather, as well as when flying at night in the vicinity of obstacles that are inadequately equipped with warning or hazard lights.

In some instances, such as in making an ILS approach, the pilot is provided with specific information as to the angle of the slope (that is, angle from the horizontal — either up or down) of the flight path that he must maintain. To maintain such an angle of slope (neglecting the effects of wind), the pilot must fly at a vertical rate of descent (or climb) that is a function of his speed or velocity along his flight path such as obtained from a DME speed readout. It will be noted that, unless equipped with expensive electronic computers or the like, the aircraft does not include an instrument indicator that directly reads the angle of slope of a flight path being flown by an aircraft, whereas nearly all aircraft are provided with rate of climb (or descent) indicators as well as air speed indicators and/or DME speed indicators which jointly provide information from which the angle of slope can be determined.

Consequently, to maintain a particular slope angle, a pilot need only fly at an indicated speed that bears a particular ratio to an indicated vertical rate of climb (or descent), with such ratio being determined by the desired angle.

It is an object of this invention to enable a pilot desirous of maintaining a flight path of a particular slope angle to readily compute the rate of vertical speed that must be maintained for any preselected slope speed and vice versa. A closely related object is to enable the pilot on being advised of vertical and slope speeds to compute the corresponding slope angle.

On occasion a pilot desires to effect a predetermined change of altitude in a predetermined flight distance, and must be able to compute the vertical rate of speed that must be maintained for a preselected slope speed (or vice versa) to obtain such change of altitude.

It is therefore another object of the invention in accordance with the above object to enable a pilot to calculate quickly what rate of climb (positive or negative) must be maintained for a selected air speed (or vice versa) to effect a certain change in altitude in a certain distance. A closely related object is to enable a pilot to determine from a known slope angle or climb and speed data what change in altitude is being effected in a preselected distance (or vice versa).

Yet another important object of the present invention is to provide a slide rule that will satisfy the foregoing objects, which will be inexpensive, easily used, and which will be reliable in use.

An important feature of the calculator is the provision of a single scale for selectively reading vertical distance or vertical velocity.

Other important objects, features and advantages of the invention will become apparent during the ensuing description of a preferred embodiment of the same that is to be taken in conjunction with the accompanying drawings, wherein.

Figure 1:
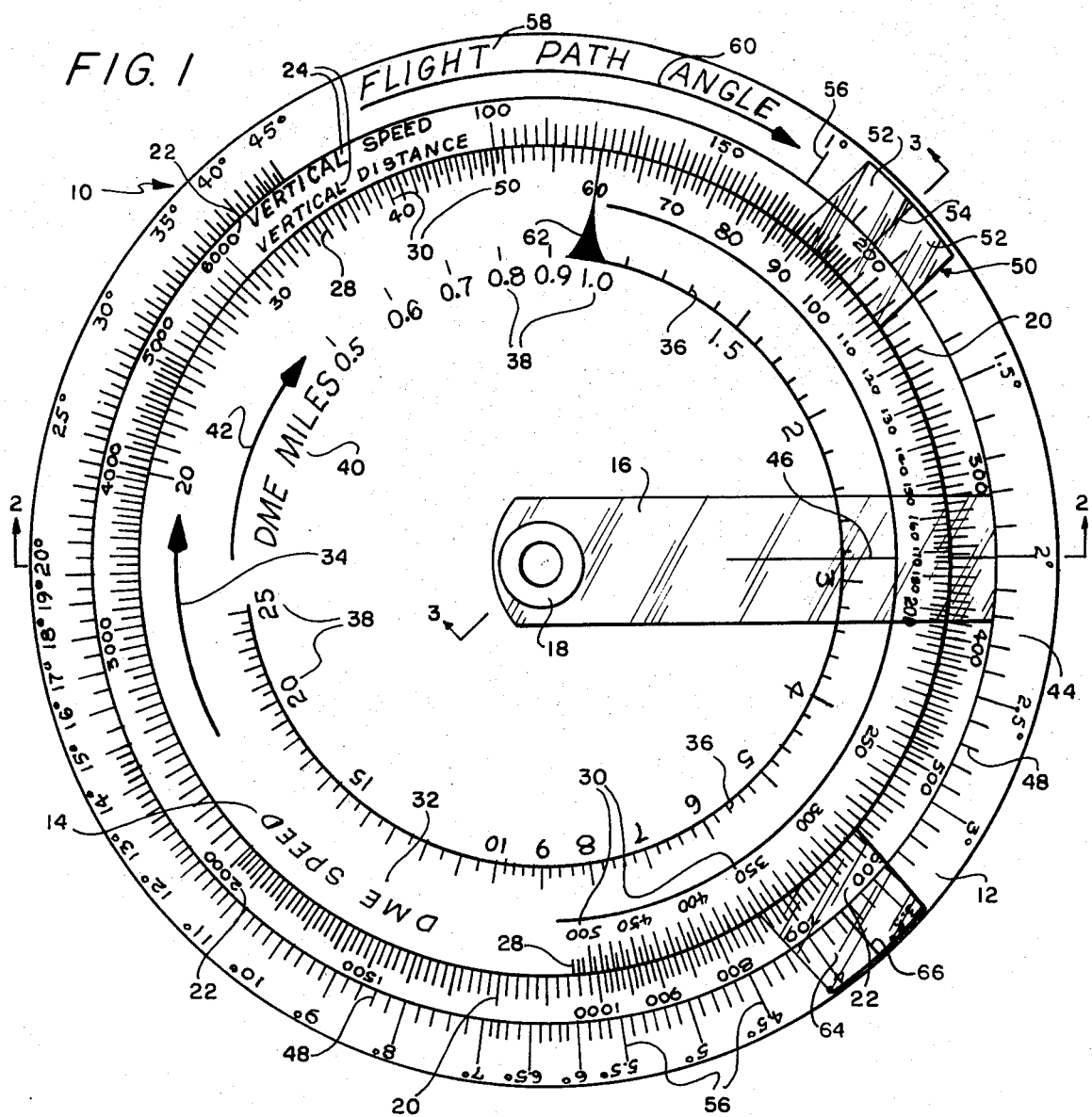
FIG. 1 is a top view of the calculator.
Figure 2:
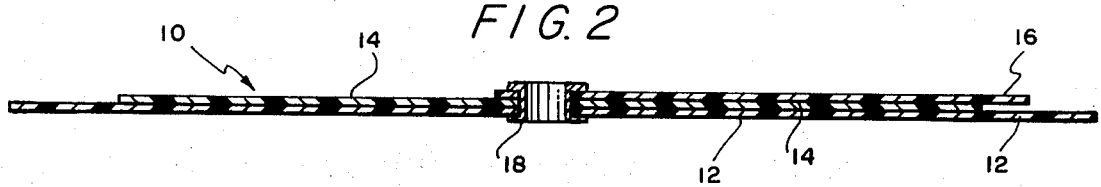
FIG. 2 is a vertical sectional view taken upon the plane of the section line 2—2 in FIG. 1; and, FIG. 3 is a fragmentary vertical sectional detail view taken upon the plane of the section line 3—3 in FIG. 1.
Figure 3:
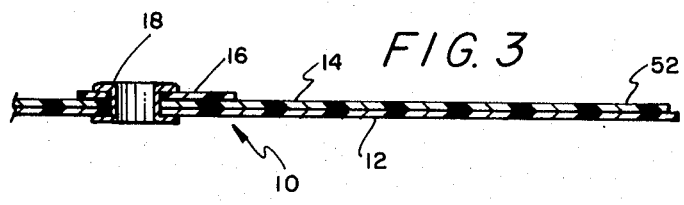

Referring now to the drawings, wherein like numerals designate like parts throughout the various views, the reference numeral 10 designates the calculator generally. The calculator 10 is somewhat similar in construction to conventional circular slide rules and comprises a circular base disc or plate 12 on the top of which is coaxially and slidably positioned a similar disc 14 of smaller diameter. The discs 12 and 14 are preferably of white and opaque plastic or synthetic resin material such as is usually employed in circular slide rules, though they can be of metal or any other suitable material if desired or deemed expedient.

A cursor arm 16 of flat and transparent plastic or synthetic resin material such as acrylic resin is disposed on top of the disc 14, and a metallic rivet 18 extends rotatably through the centers of the discs 12 and 14 and an end portion of the arm 16 as clearly shown in the drawings. The rivet 18 serves not only to secure the discs 12 and 14 and the arm 16 together, but serves also as a bearing of sufficient friction that the discs 12 and 14 and the arm 16 can be rotated relative to each other with a minor degree of force and will tend strongly to retain their relative positions in the absence of any definite disturbing force or torque.

The radially innermost annular area or portion of the disc 12 not overlain by the disc 14 is scaled logarithmically, preferably so that the entire 360° requires exactly two logarithmic cycles, and such scale designated at 20 is provided with numerical indicia such as indicated at 22 with one logarithmic cycle of the scale having such numerical indicia ranging from 100 to 1,000, and the following cycle having its numerical indicia running conveniently up to about 6,000 as shown so as to leave space for a legend 24 on the disc 12 reading on an upper line "VERTICAL SPEED" and a lower line "VERTICAL DISTANCE". The dual legend 24 is appropriate as the numerical indicia thereof can be selectively interpreted as having the dimension of distance and speed, as will be presently explained.

The scale 20 is juxtaposed to a logarithmic scale 28 on the outer periphery of the disc 14. The scale 28 has the same cycle length as the scale 20, and as shown, a cycle of each of the scales 20 and 28 subtends a central angle from the hollow rivet 18 of 180°.

The scale 28 is provided with numerical indicia 30 ranging from about 20 to about 500, whereby the portion of the scale 28 which would include the contiguous numerical ranges of 10 to 20 and 500 to 1,000 can be omitted and the space that would be otherwise so used is provided with the legend 32 reading "DME SPEED" and an arcuate arrow 34 designating the scale 28. The expression "DME SPEED" can be interpreted to means the true air speed of an airplane along its flight path (neglecting the effect of wind) or the rate of closure (or opening) of an aircraft with a particular ground location of a radio transponder as measured and indicated in the aircraft by electronic gear known as distance measuring equipment (abbreviated and commonly known as DME).

Radially inwardly of the scale 28, the disc 14 is provided with another logarithmic scale 36 of the same cycle length as the scales 20 and 28; that is, the cycle length of scale 36 is such that the arc subtended by the scale that is accompanied by a change in its numerical value by a factor of 10 to 180°. The scale 36 is provided with numerical indicia 38 from 0.5 to 25 as shown and a legend 40 reading "DME MILES" and an arcuate arrow 42.

In the calculator 10, vertical distances and vertical speeds are given in units of feet and feet per minute and the units of slope distance (DME MILES) is the nautical mile and of the slope speed (DME SPEED) is the knot (1 nautical mile per hour).

The transparent cursor or arm 16 extends radially from the hollow rivet 18 to a position overlying the scale 20, but terminates short of the outer peripheral portion 44 of the disc 12 as shown clearly in FIG. 1. The cursor 16 is provided with a radial hair or scribe line 46 against which corresponding numerical indicia values of the scales 20, 28 and 36 can be read.

For any given relative angular position of the discs 12 and 14, the numerical readings of the juxtaposed portions of the scales 20 and 28 have a constant ratio. The value of such ratio is constant for all corresponding readings on scales 20 and 28 and the value of such ratio uniquely defines the slope angle of a flight path. For the particular relative settings of the discs 12 and 14 shown in FIG. 1, the flight path is such that the aircraft descends (or ascends), according to the readings at the hairline 46, at the rate of 347 feet per minute (when read with respect to scale 28, scale 20 is deemed to have velocity dimensions) while traveling along its flight path at a speed of 172 knots. This means that an altitude change of 347 feet accompanies movement of the aircraft along its flight path for 1 minute, with such flight path distance being 172 times 6076.1 (there being 6,076.1 feet per nautical mile) divided by 60, or 17,416 feet. The slope angle characterizing such relative positions of the discs 12 and 14 is arc sin 347/17,416, or 1.14°. The discs 12 and 14 are provided with means for indicating the angular values corresponding to the relative angular positions of the discs. One of such discs can carry an appropriately calibrated angular scale with the other disc having an index against which the angular scale may be read. In the preferred construction such an angular scale 48 is provided and the same is disposed on the outer peripheral portion of the disc 12 as shown in FIG. 1, and an index means 50 is provided on the disc 14, such means 50 being preferably in the form of an integral radial extension or tab 52 of the disc 14. The tab 52 terminates at a radial distance from the pivotal axis defined by the rivet 18 slightly less than the radius of the disc 12 so as to overlie the scale 48. The tab or extension 52 is transparent and the radial portion thereof overlying the scale 48 and radially outwardly of the scale 20 is provided with a radial hairline or scribe line 54. The tab 52 and its hairline 54 can be located at any arbitrary position about the periphery of the disc 14 provided the scale 48 and the numerical angular indicia 56 provided for the latter is appropriate to such position. In the preferred construction the scale 48 and indicia 56 are identified by a legend 58 reading "FLIGHT PATH ANGLE" and an arrow 60.

With discs 12 and 14 positioned as shown, the flight path angle can be seen to be 1.14°.

In the illustrated preferred construction, the position of the tab 52 is disposed to be angularly adjacent speeds (on the scale 20) commonly employed by modestly powered aircraft of moderate wind loading on descent, such as about 100 knots. This usually makes it possible for the pilot to confine conveniently his consideration of the computer 10 to only a minor angular portion of the same.

It happens that such convenient location of the index tab 52 is realized when the scale 48 and the angular indicia 56 are such that the latter reads the arc sin of the juxtaposed reading of the scale 20 when the latter divided by the numerical constant 10,000. The value of such constant can be arbitrarily selected with a change in the value thereof necessitating appropriate relocation of the index tab 52.

As thus far described, a preselected slope angle can enable the user to set the hairline 54 to such angle on the scale 48 such as to 1.14° as shown in FIG. 1, whereby the hairline 46 of the cursor 16 can be set to a predetermined vertical speed (feet per minute) on scale 20 to read on the scale 28 the necessary slope speed in knots to maintain such slope angle, and vice versa. Conversely, adjustment of the discs 12 and 14 to juxtapose predetermined vertical and slope speeds not only enables reading the corresponding slope angle on the scale 48, but also sets the discs 12 and 14 into position for readily determining other relationships of a flight path characterized by such slope angle such as other corresponding vertical and slope speeds, and as will be seen the correlation of various slope distances with vertical distances.

The scale 36 and its indicia 38 on the disc 14 are angularly oriented relative to the scale 28 and its numerical indicia so that the (radically) juxtaposed readings on the scale 36 multiplied by the numerical constant 60 equals the readings on the scale 28 (along any radial line from the center of the rivet 18). For example, with the computer 10 set as shown in FIG. 1, the hairline 46 gives a reading of 2.87 nautical miles on scale 36 and of 172 knots on scale 28. The value of the constant 60 is not arbitrarily selected, but occurs by reason of there being 60 minutes in an hour.

The consequence of the described relation of the scales 20, 28, 36 and 48 is that the readings of scale 20 (interpreted as feet rather than as feet per second) bears the same relationship to the readings of the scale 36 as previously described as existing between the velocity readings of scales 20 and 28 insofar as the relative positions of the discs 12 and 14.

For example, a slope angle of 1.14° not only corresponds to 347 vertical feet per minute at a slope speed of 172 knots, but also corresponds to a vertical distance of 347 feet for a slope distance of 2.87 nautical miles.

Accordingly, for a given slope angle and appropriate adjustment of the discs 12 and 14 by means of the hairline 54 and the scale 48, the hairline 46 can be moved to not only relate vertical speeds and slope speeds as previously explained, but also enables relating selected slope distances to corresponding vertical distances, and vice versa.

Not only can the computer 10 be set to determine slope angle from predetermined vertical and slope velocities (respectively given in feet per minute and knots), but the same can in an analogous manner be set to determine slope angle from a predetermined vertical distance and slope distance (respectively given in feet and nautical miles). With the computer 10 set in either of such ways, the discs 12 and 14 are in such relationship as to determine all speed and distance relationships corresponding to such (slope angle) setting on simply moving the cursor 16.

Not only does the computer 10 have value in making computations pertinent to flying in accordance with instrument flight rules and plans, and in making instrument approaches to and departures from airports, the computer 10 has value under conditions of perfect visability. For example, a pilot notes on his charts that he is 4.5 nautical miles from a mountain pass over which he must fly and that he must climb at least 2,800 feet in order to safely clear the pass. Although the 4.5 nautical miles are horizontal miles rather than slope miles, such distance can be treated as slope distance with negligible error as long as the slope angle is about 10° or less. Setting the hairline 46 to 4.5 on the 36 scale and then turning the disc 14 to place the hairline 46 on 2,800 on the scale 20 quickly shows that straight line flight to the pass will require a minimum flight path slope angle of about 5.9° and that at an airspeed of 100 knots (neglecting the effects of wind), the aircraft must climb at least 1,025 feet per minute, or at an airspeed of 150 knots a climb rate of at least 1,550 feet per minute must be maintained. On the other hand, setting the hairline 46 at a climb rate of 800 feet per minute makes it clear that the true airspeed (neglecting effects of wind) must be no greater than 77 knots. If such a climb rate is not well within the performance capability of the aircraft at the altitudes involved, the pilot will be able to recognize within moments (by the use of the computer 10) that he must climb otherwise than along a straight course to the pass. The pilot thus provided with early enlightenment can follow safe climbing procedures and not risk having to make an emergency change of course near the pass which may be rendered impossible in close proximity to the pass by bordering mountains. This capability of the computer 10 is especially valuable to pilots unfamiliar with the deceptiveness and treacherous character of mountain flying.

The disc 12 is provided with an index marker 62 as shown in FIG. 1 at a position corresponding to 60 on the scale 28 (or unity on the scale 36) which is read against the indicia 22 of scale 20 to give a reading of vertical feet per slope nautical mile. This is of great value in determining flight parameters to comply with regulations setting minimum airport departure climbout rates in terms of vertical feet per nautical mile.

Very worthwhile computational results can be obtained on considering the indicated air speed corrected to true air speed as being the DME speed as far as the calculator is concerned. Indeed true air speed corrected for wind will be equal to or very near equal to indicated DME speed on a flight path directly toward or away from the transponder station.

Absolute precision insofar as slope distance and slope speed are concerned is obtained through use of the DME indicators of distance and speed on the aircraft instrument panel as such instruments respond to the distance (or the time rate of change of distance) between the aircraft and the transponder along essentially a straight line therebetween, that is, the slope distance. It is because of the greater precision realizable in the use of the computer or calculator 10 with DME data rather than with indicated air speed data (even when corrected for temperature and altitude) that the legends 32 and 40 each incorporate the expression "DME" to emphasize the preferred use of DME data or instrument indications as to distance and speed. Needless to say corrected indicated air speed data (true air speed), particularly if modified to compensate for wind (if the latter is known), can be usefully and beneficially employed, and on true courses that are not such as to be aligned with the transponder station may necessarily have to be used.

It will be apparent to those skilled in the art that the calculator 10 can be used in connection with the aircraft's conventional rate of climb indicator and the conventional air speed indicator relative to computations pertaining to curved as well as straight paths of ascent or descent.

The calculator 10 has been set forth in relation to an English system of units having to do with feet, feet per minute, nautical miles (6,076.1 feet per nautical mile) and knots. Clearly the calculator 10 could be appropriately scaled for statute miles (5,280 feet) and statute miles per hour rather than for nautical miles and knots. The desirability for doing such appears nil as the conversion from statute to nautical miles has long since been made in aircraft instrumentation and navigation.

However, the calculator 10 can be and is shown as modified to deal with metric units of vertical distance and vertical speed as well as those given in English units. Such capability for dealing with metric units may in the course of time become virtually mandatory. Such dual capability is obtained by considering the numerical indicia 22 of scale 20 to be in units of meters or meters per minute, rather than in English units. The numerical indicia 30 and 38 of scales 28 and 36 are read respectively as before and the readings of scales 28 and 36 would as before have the ratio of 60 to one on the same radius from the center of the rivet 18. With the indicia 22 of scale 20 interpreted in terms of meters as units rather than in terms of feet, it might be desirable that the numerical range of the indicia have extreme values about one-third of such extreme values as are illustrated in the drawings suitable for the units of feet. As those skilled in the art will immediately understand, this is because there are about 3 feet in a meter.

The illustrated indicia 22 and scale 20 can be used for meter (or feet) interpretation as now constituted as it would cover a range of 100 meters (or 100 meters per minute) to 6,000 feet (or 6,000 feet per minute). However, it would be preferable to include lower numerals such as down to the numeral 30 in which event the upper numerical limit would have to be reduced, or a logarithmic cycle length of 120° rather than 180° can be employed. The computer 10 is shown with the particularly illustrated scale 20 and 22 as the latter are purely a matter of choice based on the principles discussed above, and because the use of English units will prevail for some time yet to come in the United States.

For use with the indicia 22 and the scale 20 (when the latter are considered as the numerical values of metric units, namely, vertical meters per minute or vertical meters), the disc 14 is provided with a second tab 64 generally similar to the previously described tab 52. The tab 64 includes a scribe line or hairline 66. The tab 64 and its hairline constitute, as does the tab 52 and its hairline 54, an index against which the angular scale 48 can be read. With the tab 52 and hairline 54 disposed angularly on the disc 14 as shown, the tab 64 and hairline 66 are disposed as shown with the latter being substantially in radial alignment with the indicia number 324 on the scale 28 so as to give an angular reading of about 3.75° with the discs oriented as shown in FIG. 1.

If desired or deemed expedient, the tab 52 and its hairline 54 can be labeled conspicuously as "ENGLISH", "UNITS OF FEET", or the like, with the tab 64 and its hairline 66 being conspicuously labeled "METRIC", "UNITS OF METERS", or the like.

When the indicia 22 is in terms of meters, the index 62 gives on scale 20 the number of vertical meters per nautical mile.

The computer 10 can be used to make computations wherein vertical distances and speeds are given in either English or metric units. Indeed, it will be manifest that the computer 10 enables a pilot to quickly change (for a given or computed slope angle) parameters of such path from English units to metric units and vice versa.

Reference is now made to the appended claims in order to ascertain the actual scope of the invention.

I claim:

1. A slide rule for use in making aircraft ascent and descent calculations comprising relatively movable first and second members, said first member being graduated in a logarithmic scale of a given cycle length with indicia to give numerical readings ranging from less than 120 to above 2,000, said first member also being graduated in a scale and provided with numerical angular indicia to give angular readings ranging from below about 1° to above about 10°, a trigonometric function of which is equal to the corresponding numerical readings of the logarithmic scale when the latter readings are divided by a constant numerical factor selected to be in the range of about 1,000 to about 100,000, an index on the second member and operatively associated with the angular indicia, said second member being graduated in a first logarithmic scale of said given cycle length with indicia giving numerical readings ranging from less than 80 to above 150, said second member also being graduated in a second logarithmic scale of said given cycle length with indicia giving numerical readings, and said first and second scales of the second member being positioned relative to each other so that the numerical readings given by the first scale are the same as the corresponding numerical readings of the second scale when the latter are multiplied by 60.

2. The combination of claim 1, including a second index on the second member and operatively associated with the angular indicia.

3. The combination of claim 1, wherein the second member is provided with a second index at the numerical position of unity on the second scale and operatively associated with the logarithmic scale on the first member.

4. The combination of claim 1, wherein the slide rule of the circular type, with the given cycle length subtends an angle less than about 180°.

5. The combination of claim 4, wherein the first and second members are discs with the latter being relatively smaller and disposed on top of the former.

6. The combination of claim 4, including a cursor operatively associated with all the logarithmic scales.

7. A slide rule calculator of the circular type for use in making aircraft ascent and descent calculations comprising first and second pivotally connected members, said first member being graduated in a logarithmic scale of a given cycle length and provided with numerical indicia as to a vertical flight component, said second member being provided with a logarithmic scale of said given cycle length and provided with numerical indicia as to a slope flight component, one of said members having a graduated scale with angular numerical indicia thereon that is the arc sin of the product of a constant factor and the numerical value of the indicia of such of said scales as is on said one member, and with the other of said members being provided with an index against which said numerical angular indicia can be read.

8. The combination of claim 7, wherein said first member is a disc and the second member is disposed on the top of the first member and is of smaller diameter.

9. The combination of claim 7, wherein the first member is said one member, and wherein the second member is said other member.

10. The combination of claim 7, wherein the vertical component has the dimension of distance in terms of feet, and wherein the slope component has the dimension of distance in nautical miles.

11. The combination of claim 7, wherein the vertical component has the dimension of velocity in terms of feet per minute, and wherein the slope component has the dimension of velocity in terms of knots.

12. The combination of claim 7, wherein the other of said members is provided with a second index against which said angular indicia can be read, whereby the angular indicia read against the first mentioned index and the second index respectively correspond to the use of English and metric units for the vertical flight component.

* * * * *